Nov. 16, 1937.                P. PENN                 2,099,032
                        AGRICULTURAL IMPLEMENT
                         Filed Feb. 29, 1936          3 Sheets—Sheet 1
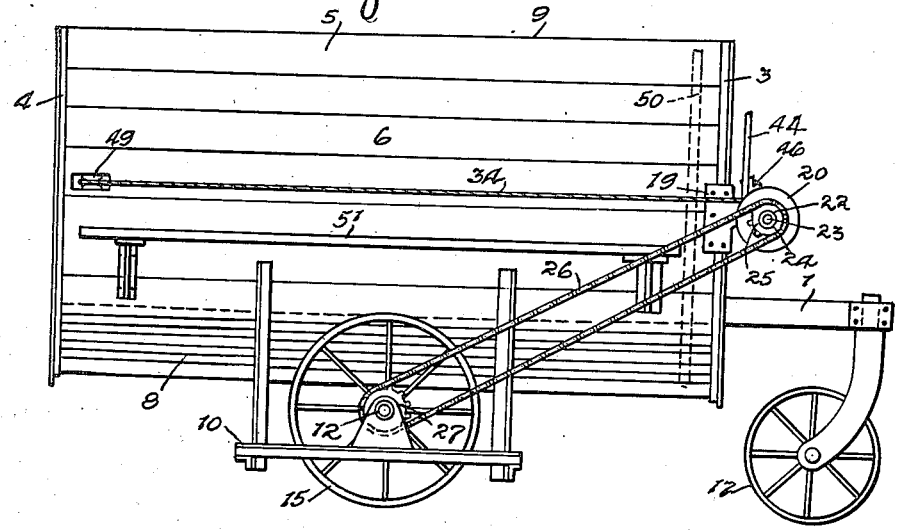
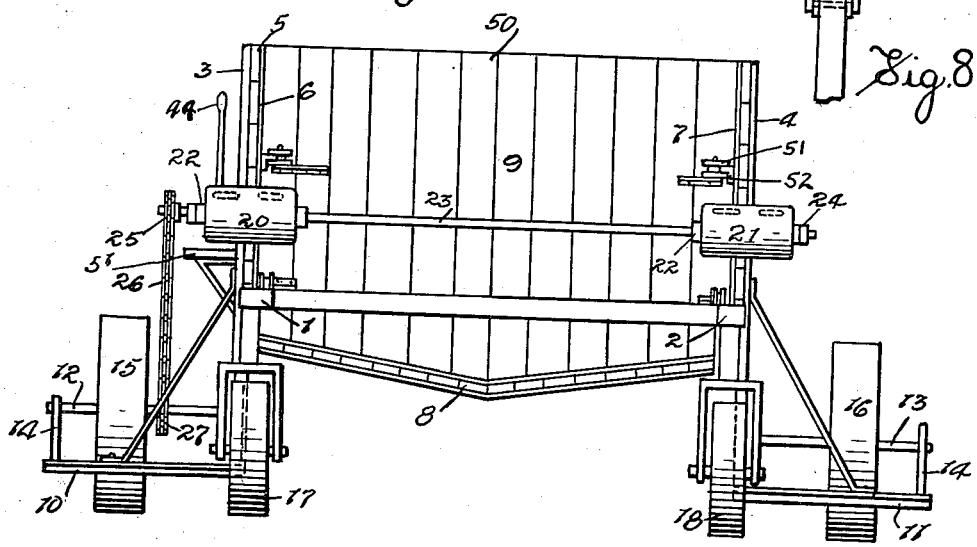
Inventor
Philip Penn

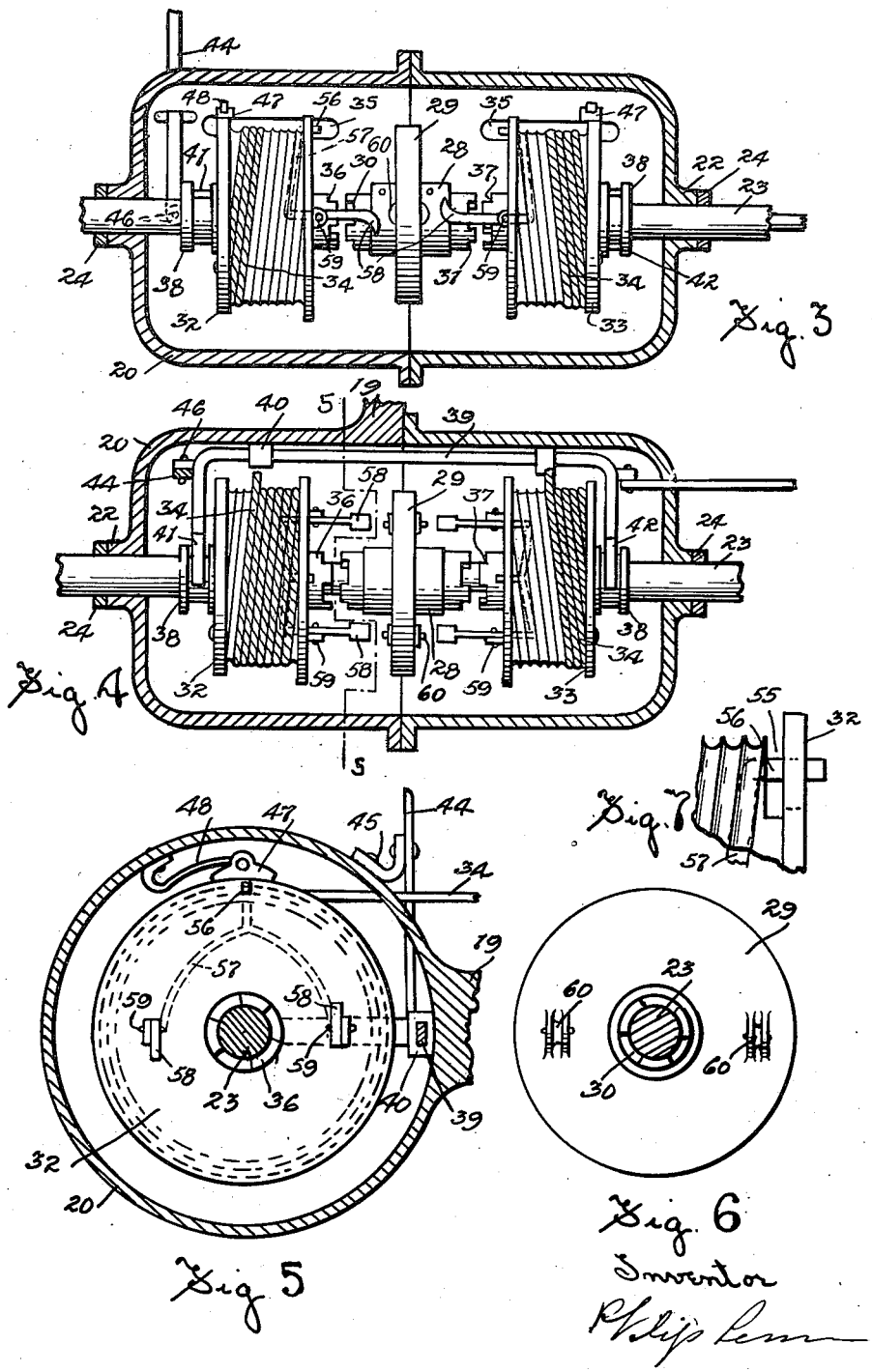

Nov. 16, 1937.  P. PENN  2,099,032
AGRICULTURAL IMPLEMENT
Filed Feb. 29, 1936  3 Sheets-Sheet 3
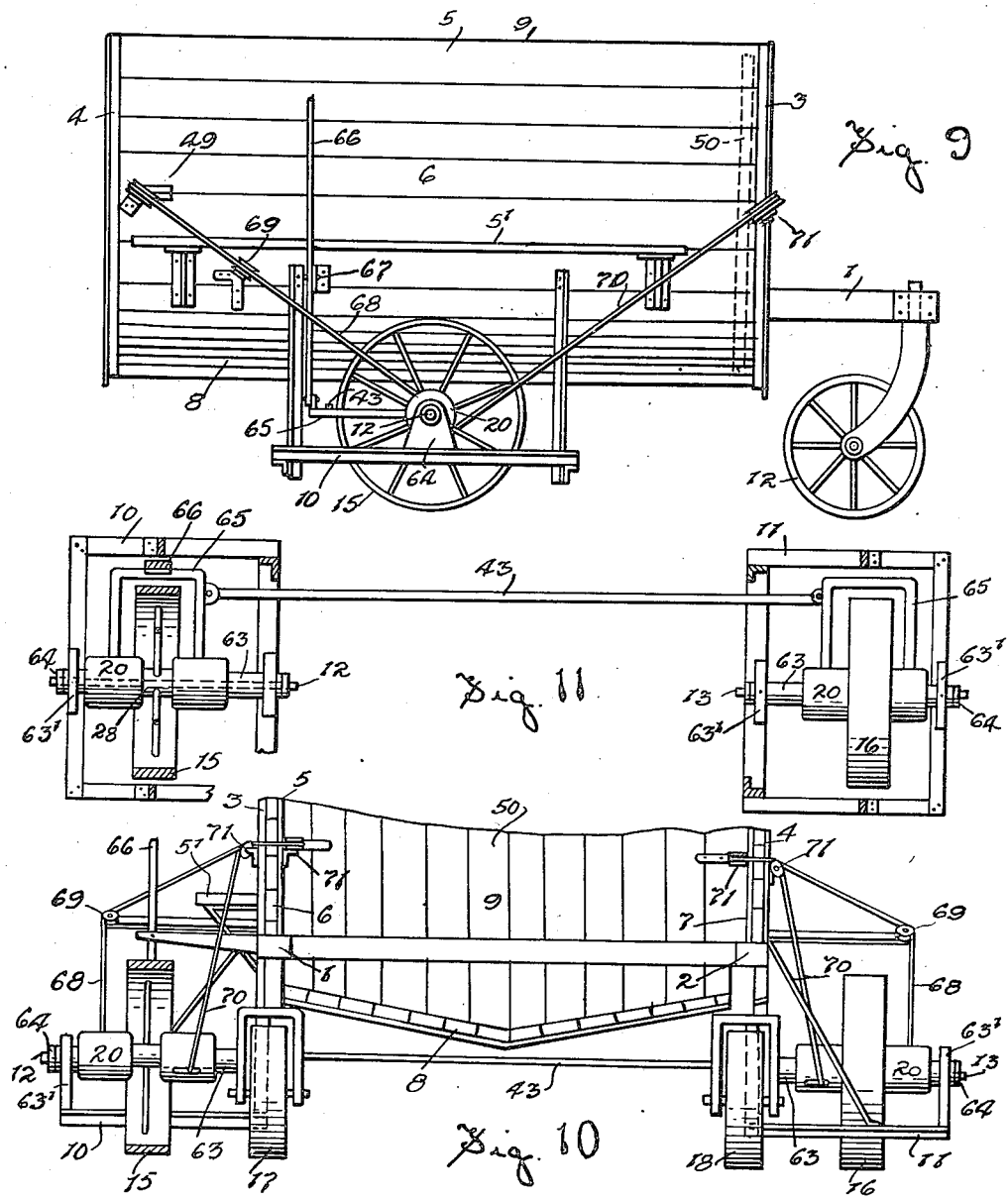

Patented Nov. 16, 1937

2,099,032

UNITED STATES PATENT OFFICE 2,099,032

AGRICULTURAL IMPLEMENT

Philip Penn, Winnipeg, Manitoba, Canada, assignor to Lion Agricultural Implements Limited, Winnipeg, Manitoba, Canada Application February 29, 1936, Serial No. 66,427

5 Claims. (Cl. 214—82)

The invention relates to agricultural implements and particularly to a wheeled vehicle for receiving and discharging a load and an object of the invention is to provide a vehicle which can be readily drawn over the field and easily loaded and which is provided with a shiftable front end or ejector, adapted when actuated rearwardly, to discharge the load on the ground.

A further object is to utilize the ground wheels to provide the power for shifting the ejector and to arrange the driving mechanism so that the ejector can be moved rearwardly or forwardly within the box or load container of the implement and entirely under the control of the attendant at all times.

A further object is to provide winding drums and suitably guided lines or cables connected thereto and to the ejector and manually actuated clutch controlled means controlling the rotation of the drums in a manner such that the ejector can be manipulated within the box as desired.

A further object is to provide means for automatically disengaging the clutch means when the ejector has reached the limiting point of forward or rear travel.

A further object is to provide a lengthwise, elevated platform for the attendant which allows him to work over the side of the box and gives him also easy access to the operating lever provided for controlling the clutches.

With the above more important and other minor objects in view, which will become more apparent as the description proceeds, the invention consists essentially in the arrangement and construction of parts hereinafter described, reference being had to the accompanying drawings, in which,—

Fig. 1 is a side view of the machine.

Fig. 2 is a front end view of the machine.

Fig. 3 is an enlarged detailed front elevation of the winding reels or drums and the clutch members associated therewith, the containing casing being shown in vertical section.

Fig. 4 is a plan view of the parts appearing in Fig. 3 and showing the casing in horizontal section.

Fig. 5 is a vertical sectional view at 5—5, Fig. 4, and looking towards the left.

Fig. 6 is a fragmentary vertical sectional view at 5—5, Fig. 4, and looking towards the right.

Fig. 7 is a detailed view showing a small portion of one of the drums.

Fig. 8 is a detailed view showing how the cables are fastened to the ejector.

Fig. 9 is a side view of the machine in a modified form.

Fig. 10 is a front end view of the major part of the machine appearing in Fig. 9.

Fig. 11 is a plan view of the side portions of the machine appearing in Fig. 9 and showing the casings for the drums and other associated parts.

In the drawings like characters of reference indicate corresponding parts in the several figures.

The main frame of the machine presents similar side beams 1 and 2 which support similar front and rear frame bars 3 and 4 of a somewhat U-shape, to which the boards 5 are permanently secured to form the side walls 6 and 7 and the bottom 8 of an open ended box or load receptacle 9.

The main frame is suitably extended, centrally, at the sides to provide side supports 10 and 11 which carry transversely aligned similar shafts 12 and 13 mounted in opposing bearings 14 secured to the supports. Ground wheels 15 and 16 are secured to the shafts and support the main body of the machine. Similar caster wheels 17 and 18 support the forward ends of the side beams and permit of ready steering.

The front ends of the side walls of the machine have similar opposing brackets 19 permanently attached thereto, and the forward ends of the brackets terminate in cylindrical casings 20 and 21 the ends of which are provided with end bearings 22. A countershaft 23 is rotatably supported in the bearings and is prevented from end shifting by applied collars 24.

A chain wheel 25 is supplied at one end of the counter shaft and is connected by an endless chain 26 to a driving chain wheel 27 secured to the shaft 12. The ground wheel 15 accordingly drives the countershaft when the machine is progressing over the ground. Obviously either ground wheel could be used for driving purposes.

Each casing contains identical parts, so that the description of one will suffice.

Centrally within the casing and permanently secured to the countershaft is the hub 28 of a disc 29 and the ends of the hub are shaped to provide similar male clutch members 30 and 31. At opposite sides of the disc and on the countershaft, I mount rotatably similar winding drums or reels 32 and 33 provided with flexible lines or cables 34 which latter extend rearwardly from the drums through suitable slots 35 supplied in the casing walls. The drums are supplied at their inner ends with similar female clutch members 36 and 37 adapted to be engaged with the male clutch members before mentioned, and have their outer ends provided with short sleeves 38 which are circumferentially channelled. A shifting bar 39 is slidably mounted in suitable bearings 40 carried by the casing and the bar has its ends forked as indicated at 41 and 42 to span the sleeves 38 within the channels. The shifting bars are connected together by a cross bar or link 43.

A lever 44 is pivotally secured to a bracket 45 carried by one of the casings and the lever extends into the casing and is attached to the shifting bar at 46. The arrangement is such that in the neutral position of the lever, the clutches are disengaged and the drums are idle. Should the lever be swung to the right the left hand clutches are engaged and the left hand drums rotate with the countershaft. Conversely when the lever is thrown to the left from neutral position, the right hand clutches are engaged and the right hand drums then rotate with the countershaft.

The drums are prevented from spinning with the countershaft, in their idle position, by engaging friction shoes 47 carried by pressure springs 48 supplied. Any other suitable device can be used for this purpose as will be readily understood.

The cables of the left hand drums pass rearwardly, at the outer sides of the side walls of the box, to rear pulleys 49 carried by the side walls and then forwardly within the box to the rear face of the ejector, to which they are secured as shown best in Fig. 8. The ejector is indicated by the applied reference 50.

The cables from the right hand drums pass rearwardly within the sides of the box and are secured to the front face of the ejector as shown also in Fig. 8.

The ejector crosses the box and when in the forward position, as shown in the drawings, closes the front end thereof. The ejector is carried by a pair of horizontally disposed, elevated rollers 51 mounted on the ejector and riding lengthwise extending side rails or tracks 52 secured to the side walls and by a pair of lower vertically disposed rollers 53 riding the side beams 1 and 2.

When the ejector 50 is in its forward position the right hand winding drums 33 have their cables fully wound thereon and at such time the cables of the left hand drums are fully unwound. Obviously the attendant can cause the ejector to travel to its rear position within the box by throwing the lever 44 to the left (Fig. 2) and can cause it to travel forwardly from its rear position by throwing the lever to the right from its neutral position, assuming of course that the machine is travelling along the ground.

An operator's platform 5' is provided at the lever side of the box and extends from front to rear and is sufficiently elevated to permit the attendant to work over the side of the box when necessary, such as when arranging the load.

In order to relieve the attendant of the necessity of manually shifting the lever, to neutral position, when the ejector has reached its front or rear position, I have provided an automatic throw out for the clutches which is now described.

Each winding drum is slotted at 55 (see Fig. 7) so that when the cable thereof is virtually fully wound up, the said cable will enter the slot and engage with a trip bar 56 crossing the slot and press it radially inwardly. The trip bar is carried by an arched bar 57 within the drum, which has its ends pivotally connected to strikers 58 which project through the end of the drum and are pivotally carried at 59 by the drum. The free ends of the strikers are weighted so that they hold the trip bar normally in its out position to be engaged by the winding cable.

The disc 29 has the opposite faces thereof provided with rollers 60 adapted to be struck by the curved faces of the strikers upon the strikers being actuated by the cables. To make this action clear I will now refer to Fig. 3 and assume that the clutch members 36 and 30 are engaged and that the drum 32 is winding. At this time the free ends of the strikers are positioned to the sides of the rollers and accordingly when the cable of the drum 32 becomes fully wound it will enter the slot and will force the trip bar inwardly an amount sufficient to press the curved ends of the strikers forcibly against the rollers. This will cause an outshifting movement of the drum 32 sufficient to disengage the clutch members 36 and 30 and bring all clutches into a neutral position. Obviously the same action will occur when the drum 33 is becoming fully wound so that the ejector will automatically stop when it reaches either its forward or its rearward position.

I wish it to be understood that any other automatic throw out device can be used to serve my purpose in regard to the automatic stopping of the travel of the ejector when it has reached its limiting positions of travel.

I might here point out that the attendant can start or stop the ejector at any time by manipulating the lever.

The device as above described can be used to discharge a load when travelling forwardly or when making a right hand turn and it is at all times under the control of the attendant. In Figs. 9, 10 and 11 I have shown a modified arrangement, which can only be dumped when the machine is travelling straight ahead.

In the latter arrangement the countershaft is dispensed with and the clutches and associated parts are mounted on the axles or shafts 12 and 13. The hub 28 becomes in this instance the hub of the ground wheel and the disc is embodied as part of the wheel adjacent the hub. There is a winding drum at each side of the ground wheel and in the same relation to the hub of the wheel as appears in Figs. 3 and 4 where the hub 28 can be considered as the wheel hub. All other parts are identical with the exception of the casing. Four casings are provided instead of two, this being necessary to admit the wheels.

The casings have their outer ends supplied with sleevelike extensions 63 which rotatably receive the shaft. The outer ends of the sleeves are received in the end bearings 63' carried by the side supports 10 and 11 and are permanently secured to the bearings. This prevents rotation of the casings and permits of the rotation of shafts 12 and 13 within the sleeves. End shifting of the shafts is prevented by applied end collars 64.

The shifting bar 65 used in the modified type passes through suitable slots provided in the casing walls and spans the ground wheel in each instance. The operating lever 66 used is pivotally carried by a bracket 67 secured to the side wall of the box, and has its lower end connected to the shifting bar.

The cables 68 from the outer drums extend first rearwardly over suitable guiding pulleys 69 to the rear pulleys 49 and then forwardly within the box and are attached to the rear face of the ejector in the same manner as shown in Fig. 8. The cables

70 from the inner drums extend forwardly over suitable guide pulleys 71 mounted on the front ends of the side walls and then pass rearwardly within the box to the front face of the ejector to which they are secured.

It will be apparent from the disclosure that in both arrangements, the ejector is fully controlled in its movement by the winding drums and cables which latter are clutch actuated, and are at all times under the direct control of the attendant and that the clutches are arranged so that they will be automatically thrown out to neutral position when the ejector has reached its forward or rear position.

I might mention that the rear end of the box can be closed by any suitable means to retain the load until it is desired to dump the same. At such time the rear end will be opened to permit the load to be discharged by the ejector.

What I claim as my invention is:—

1. The combination with a wheeled vehicle embodying a load receiving receptacle, of a vertically disposed transversely extending ejector mounted in the receptacle for fore and aft movement, pairs of clutch controlled winding drums connected by suitable flexible cables to the front and rear sides of the ejector, one pair of drums operating to wind their cables as the remaining pair unwind and means for selectively driving selected drums of the pairs, said means deriving its power from the movement of the vehicle over the field.

2. The combination with a wheeled vehicle embodying a load receiving receptacle, of a vertically disposed, transversely extending ejector mounted in the receptacle for fore and aft movement, a rotatably mounted countershaft crossing the forepart of the receptacle, a pair of winding drums rotatably mounted on each end of the countershaft and connected by winding cables to the front and rear sides, respectively, of the ejector, male clutch members secured to the shaft between the drums of the pairs, female clutch members associated with the drums of the pairs and engageable with the male clutch members in the end shifting movement of the drums, manually actuated means for simultaneously end shifting selected drums to cause the ejector to recede or advance within the receptacle and under the pull of the cables, and means for driving the countershaft from one of the ground wheels.

3. The combination with a wheeled vehicle embodying a load receiving receptacle, of a vertically disposed, transversely extending ejector mounted in the receptacle for fore and aft movement, a countershaft rotatably carried by the forward end of the receptacle and crossing the same, means for driving the countershaft from one of the ground wheels, a pair of winding drums rotatably mounted on each end of the countershaft, winding cables connecting the drums of each pair, selectively, with the front and rear sides of the ejector, male clutch members secured to the countershaft and located between the drums of each pair, a female clutch member associated with each drum and each opposing a male clutch member, a hand lever for simultaneously end shifting in either direction all drums to engage selected male and female clutch members and cause the advancing or receding of the ejector within the receptacle as the vehicle advances over the ground.

4. The combination with a wheeled vehicle embodying a load receiving receptacle, of a vertically disposed, transversely extending ejector mounted in the receptacle for fore and aft movement, a countershaft rotatably carried by the forward end of the receptacle and crossing the same, means for driving the countershaft from one of the ground wheels, a pair of winding drums rotatably mounted on each end of the countershaft, winding cables connecting the drums of each pair, selectively, with the front and rear sides of the ejector, male clutch members secured to the countershaft and located between the drums of each pair, a female clutch member associated with each drum and opposing a male clutch member, manually actuated means for simultaneously end shifting all drums in either direction to engage selected male and female clutch members and cause the advancing or receding of the ejector within the receptacle as the vehicle advances over the ground and means for automatically disengaging the engaged clutch members when the ejector reaches its limiting forward or rearward position within the receptacle.

5. The combination with a wheeled vehicle embodying a load receiving receptacle, of a vertically disposed transversely extending ejector mounted in the receptacle for fore and aft movement, pairs of clutch controlled winding drums connected by suitable flexible cables to the front and rear sides of the ejector, one pair of drums operating to wind their cables as the remaining pair unwind and power driven means for selectively driving selected drums of the pairs.

PHILIP PENN.